United States Patent
Axdorff et al.

(10) Patent No.: US 11,483,155 B2
(45) Date of Patent: Oct. 25, 2022

(54) ACCESS CONTROL USING PROOF-OF-POSSESSION TOKEN

(71) Applicant: T-Mobile USA, Inc., Bellevue, WA (US)

(72) Inventors: Tyler Axdorff, Seattle, WA (US); Senthil Kumar Mulluppadi Velusamy, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 23 days.

(21) Appl. No.: 16/749,817

(22) Filed: Jan. 22, 2020

(65) Prior Publication Data
US 2021/0226794 A1    Jul. 22, 2021

(51) Int. Cl.
| | |
|---|---|
| *H04L 9/32* | (2006.01) |
| *H04W 12/069* | (2021.01) |
| *H04W 12/72* | (2021.01) |
| *H04W 12/0431* | (2021.01) |
| *H04W 12/084* | (2021.01) |

(52) U.S. Cl.
CPC ......... *H04L 9/3213* (2013.01); *H04L 9/3263* (2013.01); *H04W 12/0431* (2021.01); *H04W 12/069* (2021.01); *H04W 12/084* (2021.01); *H04W 12/72* (2021.01); *H04L 2209/04* (2013.01); *H04L 2209/127* (2013.01)

(58) Field of Classification Search
None
See application file for complete search history.

(56) References Cited

U.S. PATENT DOCUMENTS

| | | |
|---|---|---|
| 8,090,794 B1 | 1/2012 | Kilat et al. |
| 8,613,108 B1 | 12/2013 | Aggarwal |
| 9,032,359 B1 | 5/2015 | Ahmad et al. |
| 9,069,578 B2 | 6/2015 | Singh et al. |
| 9,410,815 B1 | 8/2016 | Hirano et al. |
| 9,619,805 B1 | 4/2017 | Carr et al. |
| 9,684,882 B2 | 6/2017 | Azmoon |
| 9,817,952 B2 | 11/2017 | Cholas et al. |
| 9,864,963 B2 | 1/2018 | Cronin et al. |
| 9,886,565 B2 | 2/2018 | Nielsen et al. |
| 10,032,200 B2 | 7/2018 | Beck |

(Continued)

OTHER PUBLICATIONS

Watt, Ruaridh, "Proof-of-Possession Tokens in Microservice Architectures", MSc Computer Science Thesis, Jan. 26, 2018, pp. 1-44. (Year: 2018).*

(Continued)

*Primary Examiner* — Michael Pyzocha
(74) *Attorney, Agent, or Firm* — Han Santos, PLLC

(57) ABSTRACT

A client computing device may obtain access to protected resources with a proof-of-possession (Pop) token. The client computing device may request an access token from an authorization server via an application server. The request may include key material (e.g., token binding type, key, and key parameters) that the client computing device possesses or has access to, such as a public key of an asymmetric public/private key pair. In some embodiments, the public key may be a confirmation (CNF) key, which may be added to the access token and JWT signed by the authorization server. The private key may be retained by the client, who may then use the PoP token to prove possession of the private key.

20 Claims, 6 Drawing Sheets

(56) References Cited

U.S. PATENT DOCUMENTS

| | | |
|---|---|---|
| 10,073,589 B1 | 9/2018 | Jesensky et al. |
| 10,254,928 B1 | 4/2019 | Jesensky et al. |
| 10,257,196 B2 | 4/2019 | Dang et al. |
| 10,402,460 B1 | 9/2019 | Jesensky et al. |
| 10,482,231 B1 | 11/2019 | Harding et al. |
| 10,505,875 B1 | 12/2019 | Jenks et al. |
| 10,536,551 B2 | 1/2020 | Debald et al. |
| 10,599,839 B2 | 3/2020 | Hailpern et al. |
| 10,922,640 B2 | 2/2021 | Sarferaz |
| 11,063,927 B1* | 7/2021 | Varun Mukesh ... H04L 67/1004 |
| 2005/0021651 A1 | 1/2005 | Fellenstein et al. |
| 2010/0211872 A1 | 8/2010 | Rolston et al. |
| 2010/0293385 A1* | 11/2010 | Nanda ............... H04L 63/08 |
| | | 713/176 |
| 2012/0131476 A1 | 5/2012 | Mestres et al. |
| 2012/0167185 A1* | 6/2012 | Menezes ............ H04L 63/0815 |
| | | 726/5 |
| 2013/0339600 A1 | 12/2013 | Shah |
| 2014/0098102 A1 | 4/2014 | Raffle et al. |
| 2014/0337730 A1 | 11/2014 | King et al. |
| 2014/0359720 A1 | 12/2014 | Wray |
| 2015/0100892 A1 | 4/2015 | Cronin et al. |
| 2015/0100893 A1 | 4/2015 | Cronin et al. |
| 2015/0324271 A1 | 11/2015 | Glass et al. |
| 2016/0103805 A1 | 4/2016 | Greenberg et al. |
| 2016/0124934 A1 | 5/2016 | Greenberg et al. |
| 2016/0357674 A1 | 12/2016 | Waldspurger et al. |
| 2017/0017634 A1 | 1/2017 | Levine et al. |
| 2017/0103327 A1 | 4/2017 | Penilla et al. |
| 2017/0139890 A1 | 5/2017 | Bendig et al. |
| 2017/0168777 A1 | 6/2017 | Britt |
| 2017/0289197 A1* | 10/2017 | Mandyam ............ H04L 63/06 |
| 2017/0346804 A1* | 11/2017 | Beecham ............ H04L 63/083 |
| 2018/0096024 A1 | 4/2018 | Bitting et al. |
| 2018/0097767 A1 | 4/2018 | Ragsdale et al. |
| 2018/0152845 A1* | 5/2018 | Unnerstall ............ G06F 21/44 |
| 2018/0174229 A1 | 6/2018 | Sherwin et al. |
| 2018/0308141 A1 | 10/2018 | Beck |
| 2018/0351943 A1* | 12/2018 | Yasukawa .......... H04W 12/069 |
| 2019/0191218 A1 | 6/2019 | Cormican et al. |
| 2019/0312730 A1* | 10/2019 | Engan ................ H04L 9/3213 |
| 2019/0372993 A1* | 12/2019 | Dunjic ............... H04L 9/3268 |
| 2020/0045541 A1* | 2/2020 | Kreishan ............. H04W 12/06 |
| 2020/0143102 A1 | 5/2020 | Ziraknejad et al. |
| 2020/0153831 A1* | 5/2020 | Baer .................. H04L 63/10 |
| 2020/0169549 A1* | 5/2020 | Smith ................ H04W 12/06 |
| 2020/0192790 A1 | 6/2020 | Elges |
| 2020/0251111 A1 | 8/2020 | Temkin et al. |
| 2020/0259652 A1* | 8/2020 | Schmaltz, III ........ H04L 9/3213 |
| 2020/0334151 A1 | 10/2020 | Soini et al. |
| 2020/0334217 A1 | 10/2020 | Soini et al. |
| 2020/0334547 A1 | 10/2020 | Soini et al. |
| 2020/0336309 A1* | 10/2020 | Wang .................. H04L 63/108 |
| 2020/0349060 A1 | 11/2020 | Mestres et al. |
| 2021/0042764 A1* | 2/2021 | Rungta ............... H04L 63/0853 |
| 2021/0051098 A1 | 2/2021 | Liu |
| 2021/0224044 A1 | 7/2021 | Soini et al. |

OTHER PUBLICATIONS

De Vaere, Piet, "LIAM: An Architectural Framework for Decentralized IoT Networks", 2019 IEEE 16th International Conference on Mobile Ad Hoc and Sensor Systems (MASS), 12 pages. (Year: 2019).*

U.S. Appl. No. 16/389,528, Corrected Notice of Allowability dated Apr. 21, 2021, 26 pages.

U.S. Appl. No. 16/389,528, Notice of Allowance dated Apr. 5, 2021, 23 pages.

U.S. Appl. No. 16/749,840, Non-Final Office Action dated May 10, 2021, 37 pages.

U.S. Appl. No. 16/389,542, Non-Final Office Action dated Sep. 16, 2020, 46 pages.

Substantive | Definition of Substantive by Merriam-Webster, (article) [online]. Merriam-Webster.com. Archived Mar. 13, 2018. Retrieved on Feb. 17, 2021. https://www.merriam-webster.com/dictionary/substantive (Year: 2018).

U.S. Appl. No. 16/389,542, Final Office Action dated Mar. 3, 2021, 57 pages.

U.S. Appl. No. 16/749,840, Restriction Requirement dated Feb. 25, 2021, 6 pages.

U.S. Appl. No. 16/389,528, Ex Parte Quayle dated Dec. 24, 2020, 29 pages.

U.S. Appl. No. 16/389,528, Corrected Notice of Allowability dated Jul. 8, 2021, 35 pages.

U.S. Appl. No. 16/749,840, Final Office Action dated Oct. 7, 2021, 37 pages.

Joohwan Park et al. "Development of a web-based user experience evaluation system for home appliances"; International Journal of Industrial Ergonomics 67 (2018) 216-228.

Nicholas Caporusso et al. "A Digital Platform for Improving Accessibility in Physical User Interfaces"; 2020 the 6th IEEE International Conference on Information Management; IEEE.

U.S. Appl. No. 16/749,840, Notice of Allowance dated Jan. 31, 2022, 134 pages.

U.S. Appl. No. 16/749,852, Office Action dated Jun. 3, 2022, 72 pages.

U.S. Appl. No. 16/749,840, Notice of Allowance dated Jun. 28, 2022, 71 pages.

U.S. Appl. No. 16/389,520, Office Action dated Aug. 1, 2022, 84 pages.

* cited by examiner

ACCESS CONTROL USING PROOF-OF-POSSESSION TOKEN

BACKGROUND

Device users frequently access protected resources using credentials known only to them. In many examples, device users must provide credentials each time they log in to an account, obtain services, or otherwise access protected resources.

Efforts have been made to increase the convenience of access control without sacrificing security. Such efforts include encrypted communication using secret keys or shared keys, bearer tokens, proof-of-possession tokens, or some combination of these and others.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In one or more embodiments, techniques are provided to control access to protected resources obtained from a trusted server. In one or more embodiments, access is obtained by a client (sometimes "presenter" or "sender" elsewhere in this description) using a credentialed token that enables the client to access the protected resources without needing to provide authenticating credentials for each resource request. That is, the token indicates authorization to access the resources and proof that the presenter of the token is in fact the entity that the access token represents it to be.

Figure 1:
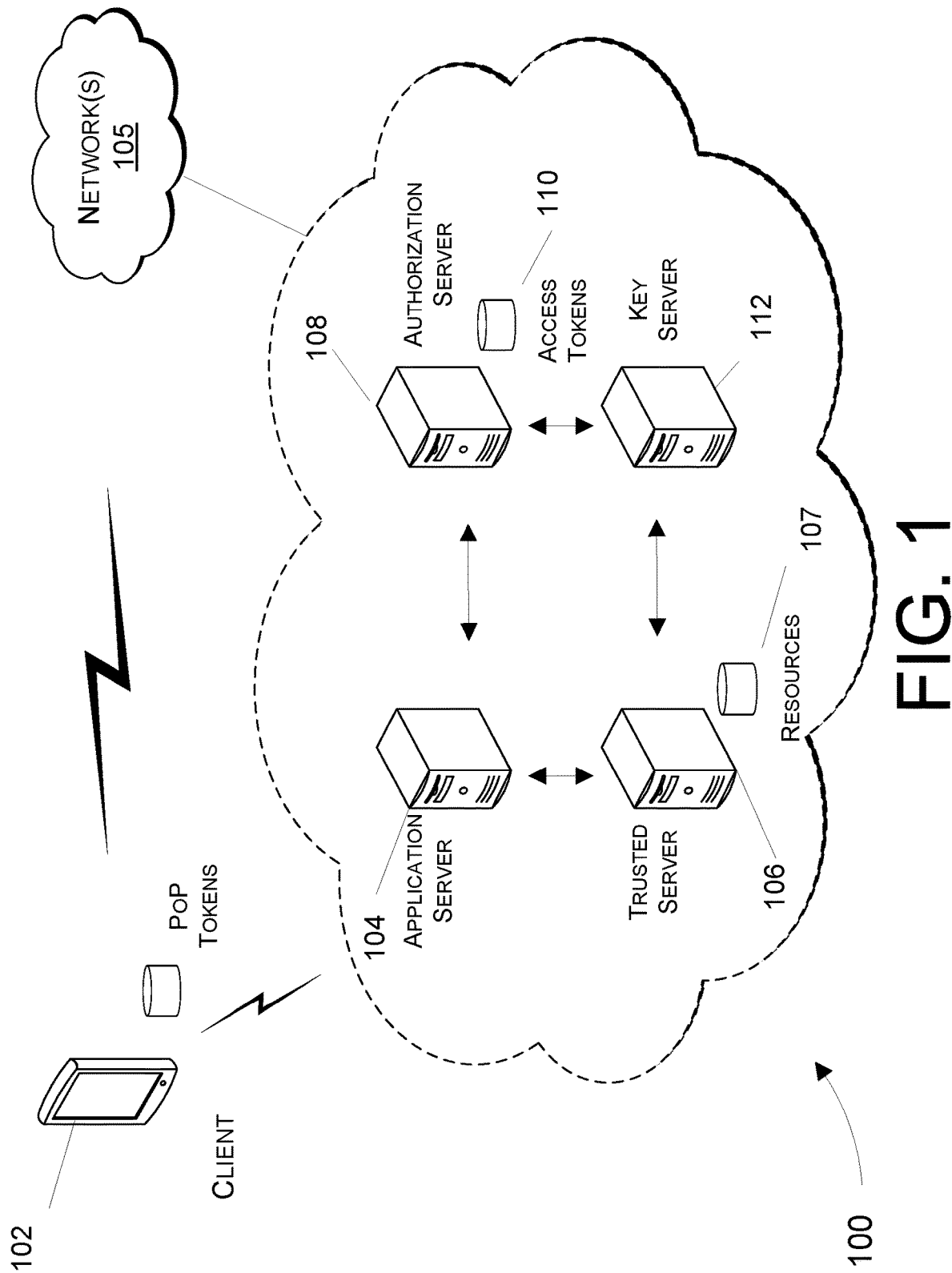
FIG. 1 illustrates an example system to implement access to protected resources.

FIG. 1 illustrates an example system 100 to implement access to protected resources. In some embodiments, a client computing device seeks to obtain a proof-of-possession (PoP) token to gain access to resources protected by a trusted server. An application server is employed to obtain the PoP token from an authorization server. In some embodiments, the authorization server may request a confirmation (CNF) key from a key server to create the PoP key. Using the PoP key, the client computing device can prove to the trusted server that the client computing device possesses a private key without having to expose the private key.

The system 100 may include a client computing device 102 configured to communicate wirelessly or over a wired network with an application server 104 to obtain protected resources from a trusted server 106. In some embodiments, the client computing device may, additionally or alternatively, communicate with the application server 104 via another network or networks 105 of, for example, other telecommunications carrier networks or the Internet. An authorization server 108 communicates with the application server 104 to receive requests for and provide access tokens 110 created in conjunction with corresponding confirmation (CNF) keys (sometimes known as CNF claims) that may be obtained from the application server 104 or from a key server 112. In some embodiments, one or more of the application server 104, the trusted server 106, the authorization server 108, and the key server 112 may be part of a single physical server, located at one or more locations (such as the core network of a telecommunication server provider), or, as indicated by dashed lines in FIG. 1, partially or entirely distributed in a cloud network.

The client computing device 102 may be a general-purpose computing device such as a desktop computer, tablet computer, laptop computer, server, and so forth. However, in some embodiments, the client computing device 102 may be a smartphone, game console, or other electronic device that is capable of receiving inputs, processing the inputs, and generating output data in accordance with one or more embodiments described herein. In some embodiments, the client computing device generates PoP tokens as discussed below.

The application server 104 may be a web server configured to provide web services. The trusted server 106 may be a resource server that stores resources in a storage 107. In some embodiments, the application server 104 and the trusted server 106 may be hosted on the same machine. The authorization server 108 may be a server that creates access tokens from credentials provided by the application server 104 and cryptographic keys provided by the key server 112. The key server may provide keys to the authorization server 108 upon request. One or more of the application server 104, the trusted server 106, the authorization server 108, and the key server 112 may be components of an enterprise information technology (EIT) server.

In some embodiments, the PoP tokens may provide a mechanism to bind keys to access tokens. The keys can then be used by a client to add signatures to outgoing HTTP requests to the trusted server 106. The trusted server 106 in turn can use the keys to make sure that the client is the same entity that requested the token originally and not one having stolen the token, for example in transit or at rest. PoP tokens may thus have particular value in scenarios that demand enhanced security protection, such as in the case of a client that needs to demonstrate possession of a private key when attempting to access a protected resource.

In general, proof of possession may be implemented with OAuth 2.0, beginning with a request by the client for an access token from an authorization server. OAuth 2.0 is an open standard for token-based access control to resources, commonly on the Internet. OAuth 2.0 deployments commonly use bearer tokens, which are access tokens that can be used to access protected resources without demonstrating possession of a cryptographic key such as a private key. PoP tokens are bearer tokens that do demonstrate possession of the private key. By using PoP tokens and requiring the client to demonstrate possession of the private key when accessing a protected resource, an OAuth 2.0 deployment can extend bearer token security.

OAuth 2.0 token binding cryptographically binds access tokens to the Transport Layer Security (TLS) layer in an OSI stack. Bound to the TLS connection itself, a stolen PoP token cannot be used over a different channel. However, every time a new TLS connection is negotiated between the client and the authorization server, a token binding negotiation (negotiating binding parameters) must occur. Still, even though the negotiation happens repeatedly, the token bindings may be long-lived and may encompass multiple TLS connections and TLS sessions between a given client and authorization server.

As indicated above, proof of possession may be implemented with OAuth 2.0, beginning with a request to the application server by the client for an access token The request may include key material (e.g., token binding type, key, and key parameters) that the client possesses or has access to, such as a public key of an asymmetric key pair. The public key, which may be a confirmation key as mentioned above, is added to the access token and may be JWT signed by the authorization server The private key is retained by the client, which can generate the PoP token with the signed access token and use the PoP token to prove possession of the private key.

The public key is reflected in the token binding ID between the client and the authorization server. The token binding ID reflects the public key along with the key parameters agreed upon in the token binding negotiation. Server verification involves the server receiving the token binding request from the client, verifying that the key parameters in the request match the token binding parameters, and validating the signature contained in the request.

Once a TLS connection is established between the client and the application server, the key material will be the same—both at the client end and at the authorization server end. The authorization server thus can validate the digital signature against the public key and return the access token if valid.

Figure 2:
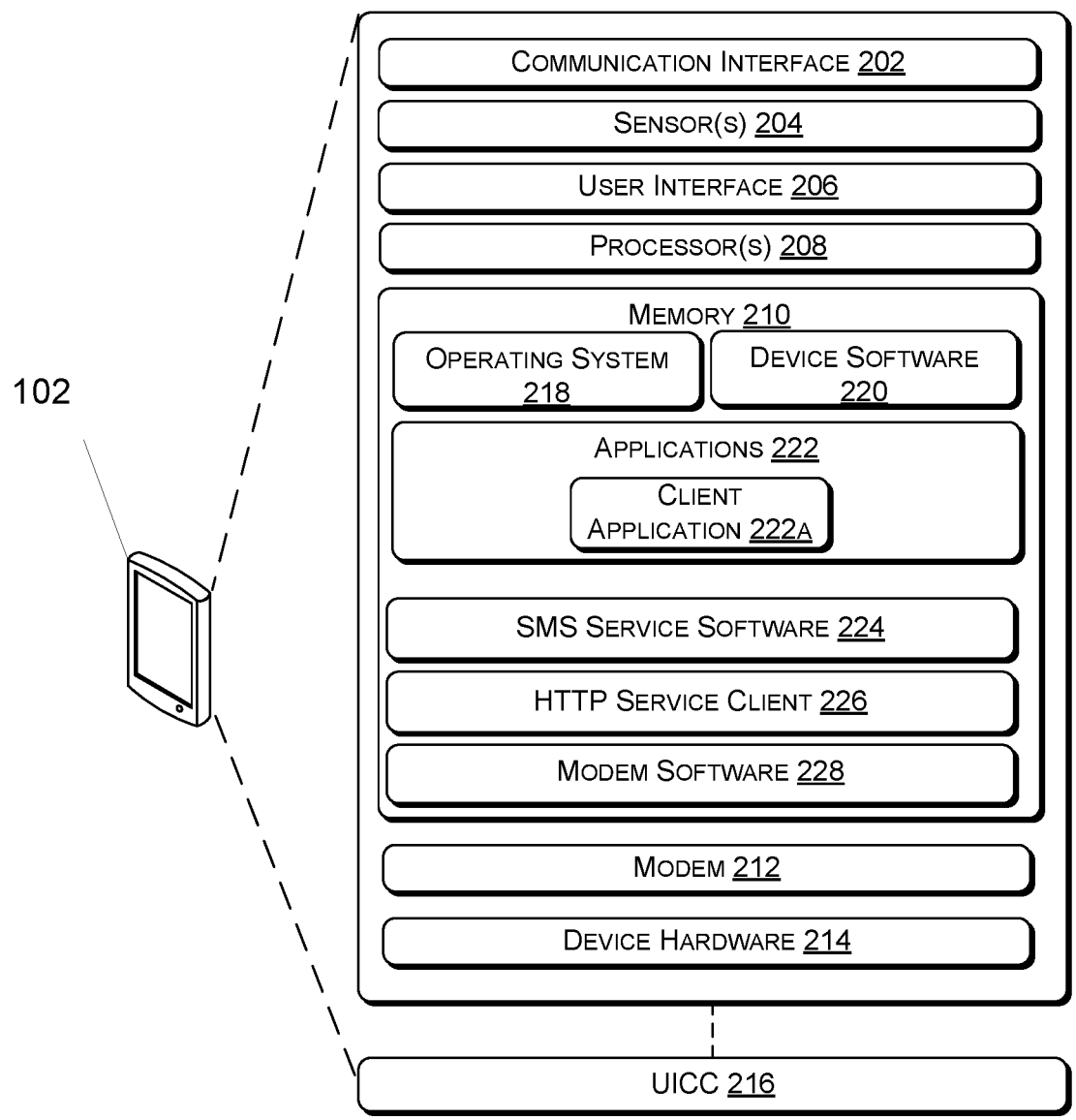
FIG. 2 is a block diagram showing various components of an illustrative client computing device.

FIG. 2 is a block diagram showing various components of an illustrative client computing device 102. The client computing device 102 may include one or more of a communication interface 202, one or more sensors 204, a user interface 206, one or more processors 208, and memory 210. The communication interface 202 may include wireless and/or wired communication components that enable the client computing device 102 to transmit or receive voice or data communication via a radio access network, as well as other telecommunication and/or data communication networks. The sensors 204 may include a proximity sensor, a compass, an accelerometer, an altimeter, and/or a global positioning system (GPS) sensor. The proximity sensor may detect movement of objects that are proximate the client computing device 102. The compass, the accelerometer, and the GPS sensor may detect orientation, movement, and geolocation of the client computing device 102.

The user interface 206 may enable a user to provide input and receive output from the client computing device 102, including for example providing one or more input to initiate device activation. The user interface 206 may include a data output device (e.g., visual display, audio speakers), and one or more data input devices. The data input devices may include, but are not limited to, combinations of one or more of touch screens, physical buttons, cameras, fingerprint readers, keypads, keyboards, mouse devices, microphones, speech recognition packages, and any other suitable devices or other electronic/software selection methods.

The memory 210 may be implemented using computer-readable media, such as computer storage media. Computer-readable media include, at least, two types of computer-readable media, namely computer storage media and communications media. Computer storage media include volatile and non-volatile, removable and non-removable media implemented in any method or technology for storage of information such as computer-readable instructions, data structures, program modules, or other data. Computer storage media include, but are not limited to, RAM, ROM, EEPROM, flash memory or other memory technology, digital optical disks including CD-ROM, Digital Versatile Disk (DVD), Blu-Ray or other optical storage, magnetic cassettes, magnetic tape, magnetic disk storage or other magnetic storage devices, or any other non-transmission medium that can be used to store information for access by a computing device. Computer storage media in the context does not consist of transitory modulated data signals. In contrast, communication media may embody computer-readable instructions, data structures, program modules, or other data in a modulated data signal, such as a carrier wave, or other transmission mechanism.

The client computing device 102 may also include a modem 212 and other device hardware 214. The modem 212 is a hardware component that enables the client computing device 102 to perform telecommunication and data communication with the radio access network. The device hardware 214 may include other hardware that is typically located in a mobile telecommunication device. For example, the device hardware 214 may include signal converters, antennas, hardware decoders and encoders, graphic processors, a Universal Integrated Circuit Card (UICC) slot (e.g., SIM slot), and/or the like that enables the client computing device 102 to execute applications and provide telecommunication and data communication functions. The UICC 216 may be an integrated circuit chip that is inserted into the UICC slot of the client computing device 102, or an embedded UICC (eUICC) that is hardwired into the circuit board of the client computing device 102.

The one or more processors 208 and the memory 210 of the client computing device 102 may implement an operating system 218, device software 220, one or more applications 222 (including an application 222a), SMS service software 224, a HTTP service client 226, and modem software 228. The one or more applications 222 may include a consumer application 222a and/or other applications for performing various functions, including but not limited to the authorization, authentication, and communication functions described herein. The various software and applications may include routines, program instructions, objects, and/or data structures that perform particular tasks or implement particular abstract data types. The operating system 218 may include components that enable the client computing device 102 to receive and transmit data via various interfaces (e.g., user controls, communication interface 202, and/or memory input/output devices). The operating system 218 may also process data using the one or more processors 208 to generate outputs based on inputs that are received via the user interface 206. For example, the operating system 218 may provide an execution environment, such as a Java Virtual Machine or Microsoft's Common Language Runtime™, for the execution of the applications 222. The operating system 218 may include a presentation component that presents the output (e.g., displays the data on an electronic display, stores the data in memory, transmits the data to another electronic device, etc.).

The operating system 218 may include an interface layer that enables applications to interface with the modem 212 and/or the communication interface 202. The interface layer may comprise public APIs, private APIs, or a combination of both public APIs and private APIs. Additionally, the operating system 218 may include other components that perform various other functions generally associated with an operating system. The device software 220 may include software components that enable the client computing device 102 to perform functions. For example, the device software 220 may include basic input/output system (BIOS), Boot ROM, or a bootloader that boots up the client computing device 102 and executes the operating system 218 following power up of the device.

The applications 222 may include applications that provide utility, entertainment, and/or productivity functionalities to a user of the client computing device 102. For example, the applications 222 may include telephony applications, electronic mail applications, remote desktop applications, web browser applications, navigation applications, office productivity applications, multimedia streaming applications, and/or so forth.

The SMS service software 224 may provide the client computing device 102 with the ability to send and receive SMS messages from a Short Message Service Center (SMSC), such as an SMS server that resides on the radio access network. In various embodiments, the transmission of messages between the SMSC and the SMS service software 224 may be performed according to the Mobile Application Part (MAP) of the Signaling System 7 (SS7) protocol, or alternatively via an application layer on top of a TCP/IP stack. The size of the SMS messages may be constrained by the protocol to 140 octets or 1120 bits. The SMS messages may be encoded using a variety of alphabets, such as the GSM 7-bit alphabet, the 8-bit data alphabet, the 16-bit UCS-2 alphabet, and/or so forth. In some embodiments, the SMS messages that are passed between the SMS service software 224 and the SMSC may be encrypted and decrypted by both parties according to the SCP80 OTA secure channel protocol, or another equivalent secure SMS communication protocol.

The HTTP service client 226 may enable the client computing device 102 to establish a communication session with a server, such as the application server 104, or a file service, using HTTP. HTTP is an application layer protocol that uses an underlying transport layer protocol, such as the Transmission Control Protocol (TCP), the User Datagram Protocol (UDP) and/or so forth. HTTP is a request-response protocol, in which the HTTP service client 226 may submit an HTTP request message, and the application server 104 may respond with a requested resource in a response message to the HTTP service client. In some embodiments, the HTTP service client may also use the HTTP Secure (HTTPS) protocol to communicate with the application server 104, in which the communication session is encrypted by a security protocol such as, the Transport Layer Security (TLS) protocol.

The modem software 228 may drive the modem 212 to perform telecommunication and data communication with the radio access network. The modem software 228 may be firmware that is stored in dedicated non-volatile memory of the client computing device 102. Such non-volatile memory may include read-only memory (ROM), erasable programmable read-only memory (EPROM), or flash memory.

Figure 3:
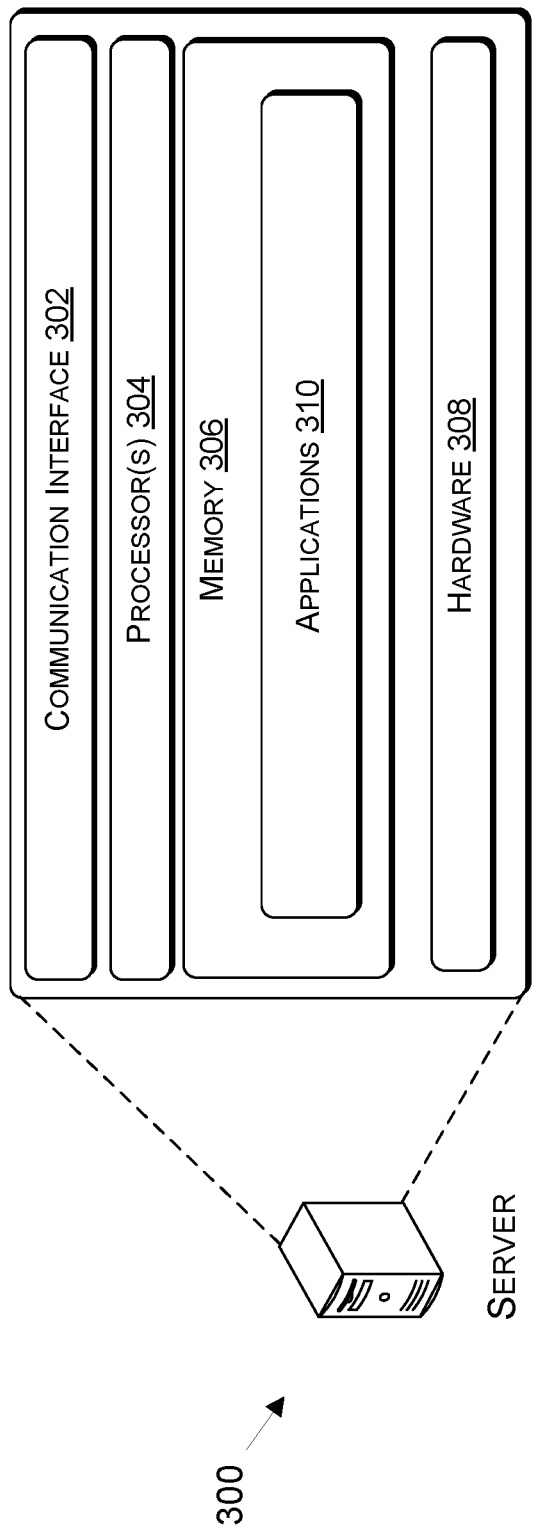
FIG. 3 is a block diagram showing an example of various components of a server that may represent any or all of the application server, the trusted server, the authorization server, and/or the key server.

FIG. 3 is a block diagram showing an example of various components of a server 300 that may represent any or all of the application server 104, the trusted server 106, the authorization server 108, and/or the key server 112. FIG. 3 may also represent an example of the EIT server mentioned above, configured physically and/or virtually to implement the functionality of the application server 104, the trusted server 106, the authorization server 108, and/or the key server 112. The server 300 is in many respects analogous to the client computing device 102 and thus may include a communication interface 302, one or more processors 304, memory 306, and hardware 308. The communication interface 302 may include wireless and/or wired communication components that enable the server 300 to transmit data to and receive data from other networked devices. The one or more processors 304 may control various functions of the server 300 and implement an operating system. The memory 306 may store the operating system and applications comprised of software components. The hardware 308 may include additional user interface, data communication, or data storage hardware.

Figure 4:
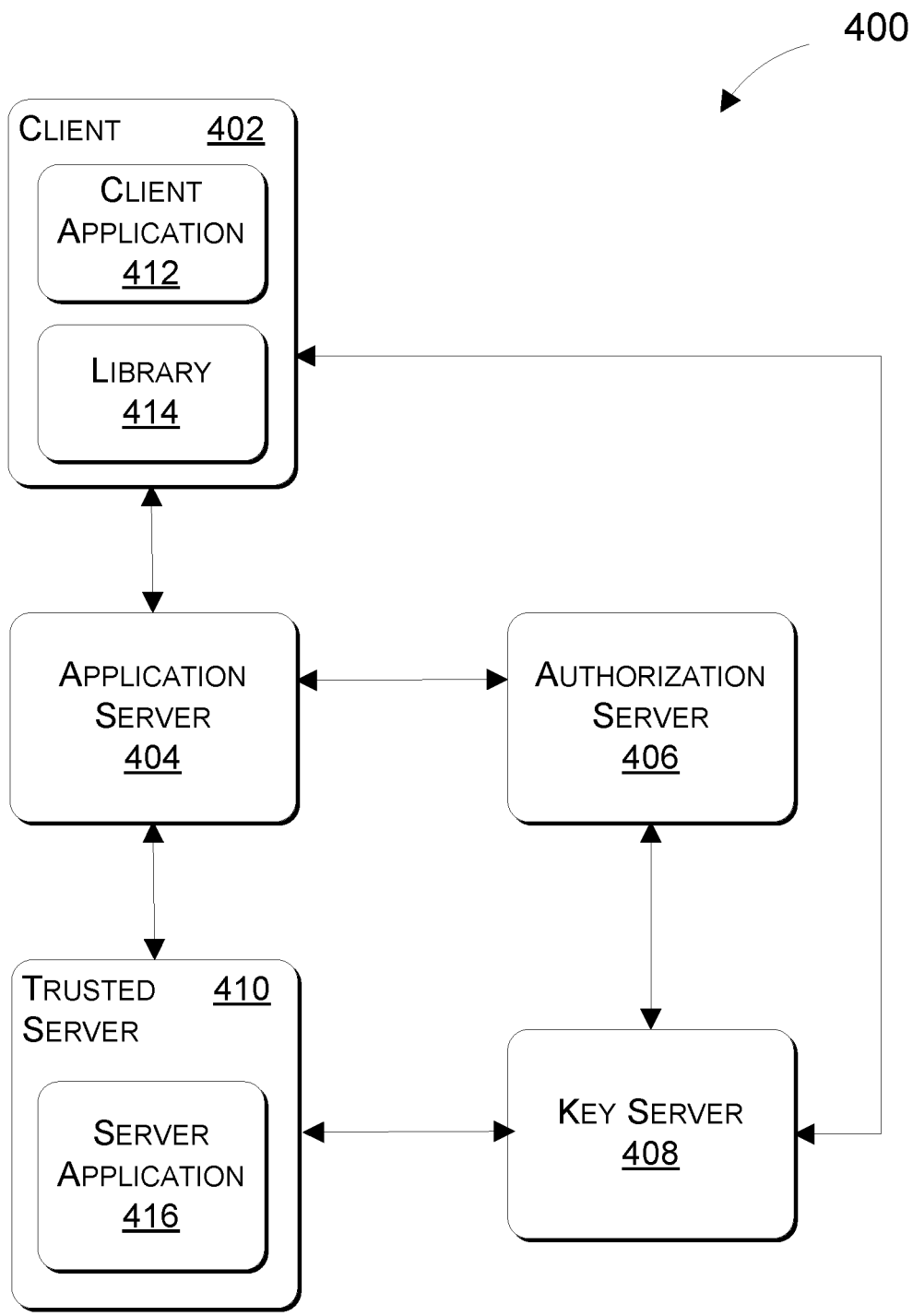
FIG. 4 illustrates an example system to implement access to protected resources.

FIG. 4 illustrates an example system 400 to implement access to protected resources. The system 400 is similar to the system 100 illustrated in FIG. 1. Additional details shown in FIG. 4 represent features of one or more embodiments described herein.

A client computing device 402 corresponding to the client computing device 102 may send a request to the application server 404 for an access token. The application server 404, which corresponds to the application server 104, may request the access token from the authorization server 406, which may respond with the access token if the request includes a CNF key. The authorization server 406 corresponds to the authorization server 108. If the request does not include a CNF key, then the authorization server 406 may request a CNF key from the key server 408, which corresponds to the key server 112. The key server 408 may provide the CNF key to the authorization server 406 in response to that request. The trusted server 410 may provide and control access to protected resources requested by the client computing device 402. In some embodiments, resources to be accessed may include, without limitation, media files, documents, records, data, etc. The resources may be made available upon authentication of the client computing device 402 in accordance with embodiments described herein.

The client computing device 402 may include a client application 412, corresponding to the client application 222a shown in FIG. 2, and a library 414. The client application 412 may, among other functions, generate the request for authorization (i.e., a request for an access token) to generate a PoP token and obtain access to resources protected by the trusted server 410 by requesting access to the resources using the PoP token as an authorized, authenticated credential. The library 414 may store PoP tokens and/or refresh tokens and may provide one or more of these tokens with requests to the application server 404.

The application server 404 may determine whether the request from the client computing device 402 is a request for an access token or a request for access to resources access-controlled by the trusted server 410. If the request is for an access token, the application server 404 may send a request to the authorization server 406 for the access token. The application server 404 may receive the access token from the authorization server 406 in response to the request and send the access token to the client computing device 402. In some embodiments, the access token may be digitally signed by the authorization server 406.

In some embodiments, however, the application server 404 may not receive an access token from the authorization server 406; If this is the case, the client computing device 402 is authenticated and secure communications between the client computing device 402 and the application server 404 proceed in accordance with, e.g., public key cryptography (PKC). There are many permutations in PKC as to which party generates keys and how key exchange is performed. Some common permutations are Kerberos, Rivest-Shamir-Adleman (RSA), and Diffie-Helman key exchange, although no limitation should be inferred.

The authorization server 406 may determine whether the request for an access token received from the application server 404 contains a CNF key. If so, then the authorization server 406 creates an access token with the CNF key and client identifier information contained in the client's request. In some examples, the request may include one or more of the client computing device's International Mobile Equipment Identity (IMEI) or Mobile Station International Subscriber Directory Number (MSISDN) of the client computing device 402, or an identifier corresponding to an aggregated user identifier managed by a communications carrier, such as T-Mobile ID™, which may bind multiple devices to a single user. If the request does not have a CNF key, then the authorization server 406 may obtain one from the key server 408.

The key server 408 may be configured to provide CNF keys to the authorization server 406. In some PoP tokens, a CNF key in a JavaScript Object Notation (JSON) Web Token (JWT) asserts that the presenter of the PoP token possesses a particular private key such that the receiver (e.g., the trusted server 410) can confirm the same without actually sending the private key to the receiver. In some examples, the presenter may be both the subject identified and the issuer identified by the JWT, the value of the CNF key may be a JSON object, and the members of that object identify the key.

The trusted server 410 may include a server application 416. The server application 416 may enable various server functions to implement access control to resources provided or controlled by the trusted server 410. For example and without limitation, the server application 416 may determine that access to protected resources should or should not be granted based on the presence of an authenticating PoP token accompanying the request for access.

Figure 5:
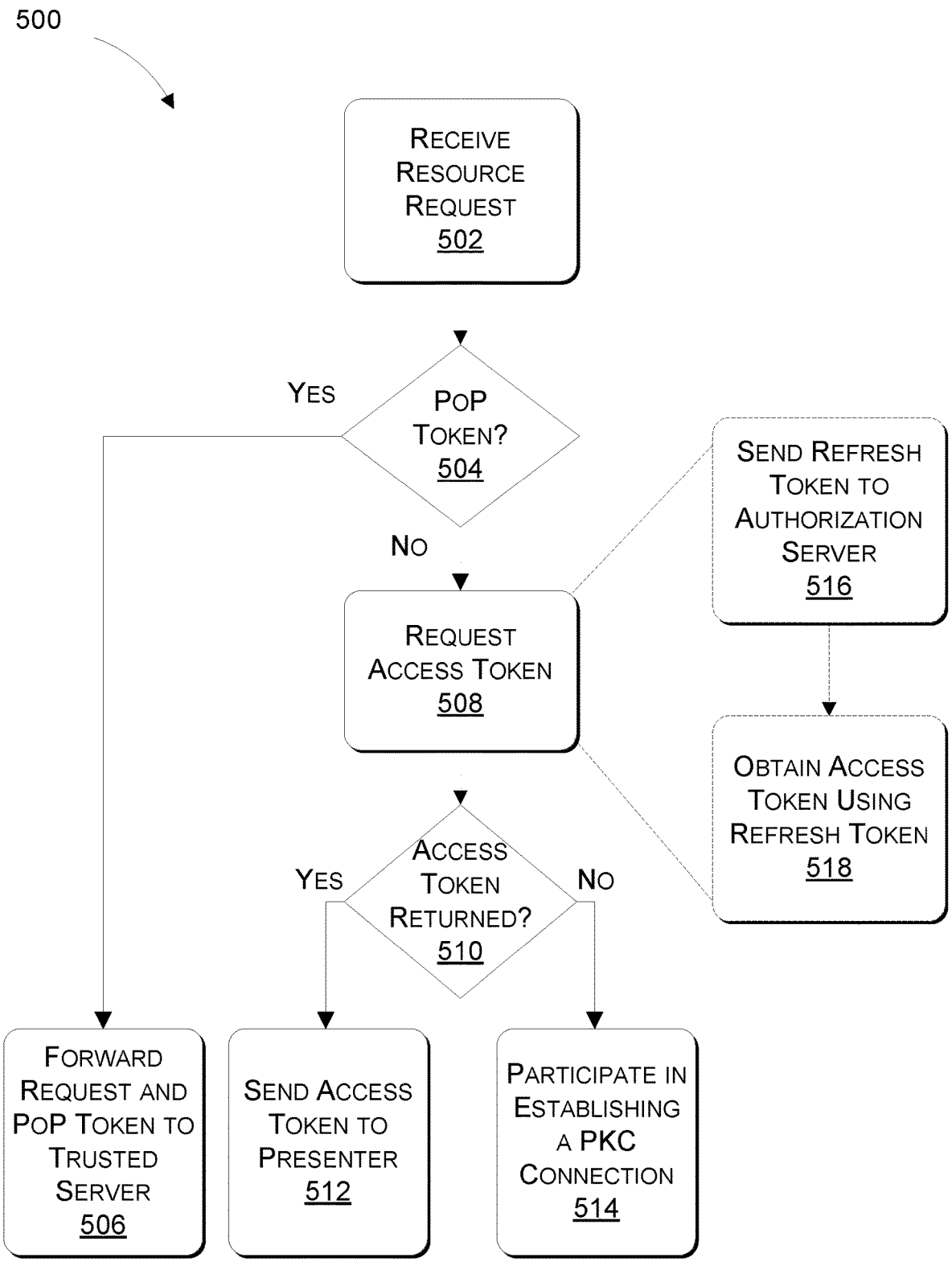
FIG. 5 is a flow diagram of an example process performed at least in part by the application server for receiving and handling requests from a client computing device for protected resources from the trusted server or obtaining a an access token from the authorization server for the client computing device to use in generating a proof-of-possession (PoP) token to request resources from the trusted server.
Figure 6:
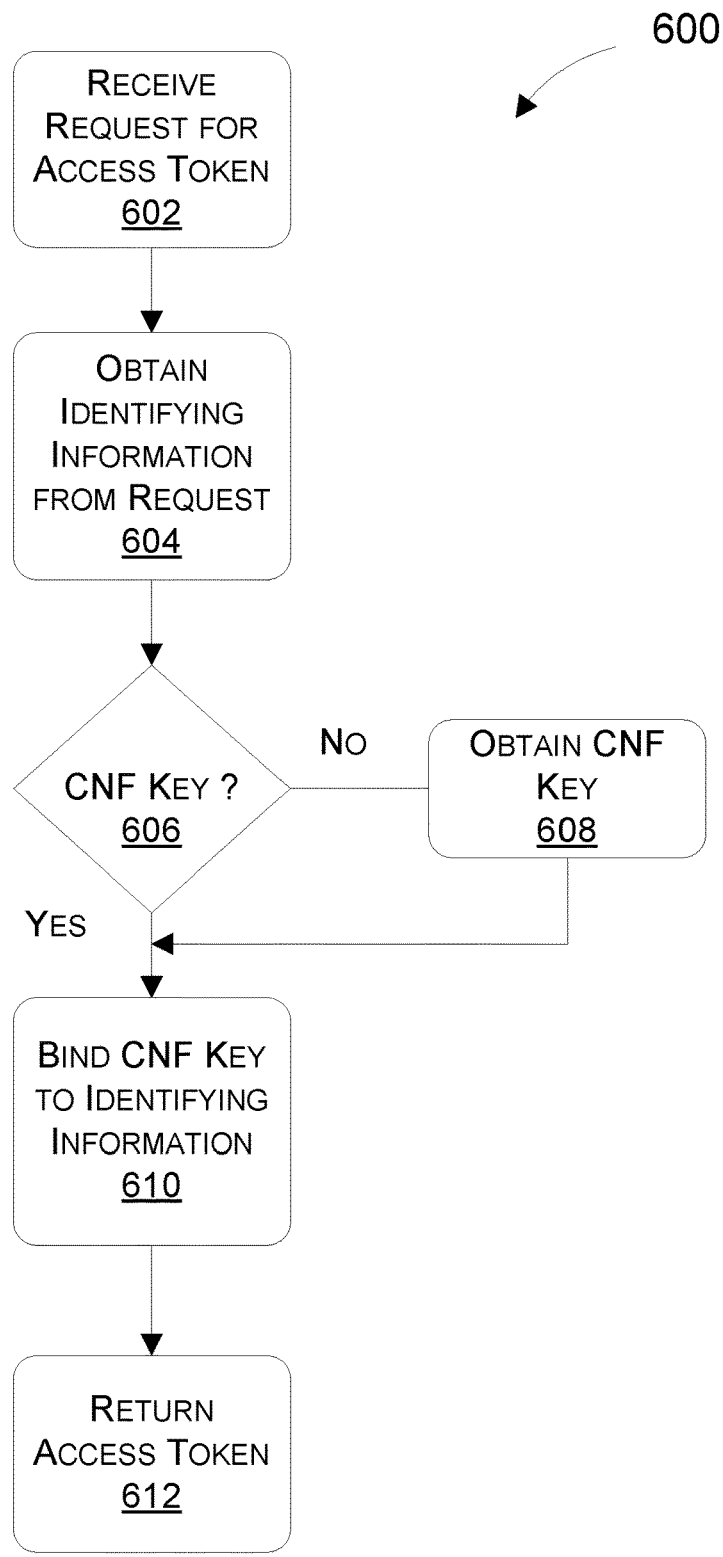
FIG. 6 is a flow diagram of an example process performed at least in part by the authorization server 406 for creating a PoP token.

FIGS. 5 and 6 present illustrative processes for implementing the access control of protected resources described herein. The processes are illustrated respectively as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the system diagram 400 of FIG. 4.

FIG. 5 is a flow diagram of an example process 500 performed at least in part by the application server 404 for receiving and handling requests from a client computing device 402 for protected resources from the trusted server 410 or obtaining an access token from the authorization server 406 for the client computing device 402 to use in generating a PoP token to request resources from the trusted server 410. At block 502, the application server 404 may receive a resource request from the client computing device 402. The resource request may be an HTTP request that contains identifying information. In some embodiments, the identifying information may identify the client computing device 402 (for example, by including, the IMEI and/or MSISDN) and/or the customer (e.g., aggregated user identifier). The request may also include a CNF key or a refresh token as discussed below.

At decision block 504, the application server may determine whether the request includes a PoP token. If a PoP token is present ("yes" at decision block 504), the process 500 will proceed to block 506, where the application server 404 may forward the request with the PoP token to the trusted server 410 to attempt access to resources protected by the trusted server 410. If no PoP token is present ("no" at decision block 504), then the process 500 will continue to block 508.

At block 508, the application server 404 may request an access token (for example, a domain access token (DAT) or a user access token (UAT)) from the authorization server 406 on behalf of the client computing device 402. The access token may be used by the client computing device 402 to generate a PoP token with which to provide an authorized and authenticated request for protected resources (i.e., the PoP token shows that the presenter of the PoP token (here, the client computing device 402) is authorized to access the protected resources and that the presenter of the PoP is the entity to which the PoP token was issued).

At decision block 510, the application server 404 may determine whether the authorization server 406 returned an access token in response to the request in block 508. If an access token was returned ("yes" at decision block 510), then the flow 500 will proceed to block 512, where the application server 404 may send the access token to the presenter. If an access token was not returned ("no" at decision block 510), then the flow 500 will proceed to block 514, where a PKC connection is established between the client computing device 402 and the application server 404.

In some embodiments, a refresh token may be created by the authorization server 406 and provided to the client computing device 402 via the application server 404. The refresh token may be provided with the access token or separately from providing the access token.

The refresh token is not a PoP token itself but may be used by the client computing device 402 to create a new PoP token. In some embodiments, the refresh token may carry the same credentialing as the PoP token previously or concurrently created. PoP tokens may be given a short time to live (TTL) to reduce the risk of theft by rendering ineffective an expired PoP token that now lacks, e.g., the private/public key pair corresponding to the connection between the client computing device 402 and the application server 404. Thus, a refresh token may enhance the security when PoP tokens are used.

Refresh tokens may be similar to PoP tokens. However, in some embodiments, refresh tokens are created to be returned to the authorization server 406 to obtain a new access token, rather than to be used as a substitute PoP token. In the meantime, refresh tokens may be stored in the library 414 of the client computing device 402.

Blocks 516 and 518 may represent sub-blocks of block 508 as indicated by dashed lines in FIG. 5, insofar as a refresh token may be used to obtain an access token, in accordance with some embodiments.

At block 516, the application server 404 may send the refresh token to the authorization server 406. Using the credentials provided in the refresh token, a corresponding access token may be created by the authorization server 406.

At block 518, the application server 404 may obtain an access token using the refresh token. The flow 500 may then proceed to decision block 510, which will be answered "yes" because an access token was just obtained using the refresh token.

FIG. 6 is a flow diagram of an example process 600 performed at least in part by the authorization server 406 for creating a PoP token.

At block 602, the authorization server 406 may receive a request for an access token. Block 602 may correspond to block 508, at which the application server 404 requests an access token from the authorization server 406.

At block 604, the authorization server 406 may obtain identifying information from the request. In some embodiments, as described above, the information may include one or more of the client computing device's IMEI or MSISDN of the client computing device 402, or an identifier corresponding to an aggregated user identifier managed by a communications carrier, such as T-Mobile ID™, which may bind multiple devices to a single user.

At decision block 606, the authorization server 406 may determine whether the request includes a CNF key. If the request does not include a CNF key ("no" at decision block 606), the process 600 may proceed to block 608.

At block 608, the authorization server 406 may obtain a CNF key from the key server 408. In some embodiments, the authorization server 406 may store CNF tokens in a database with an association to the received identifying information and/or the session. The obtained CNF key may be contained (unencrypted or in encrypted form) in a JWT to bind the resulting access token to the presenter (e.g., the client computing device 402), which can assert possession of a particular private key using the PoP token such that the receiver (e.g., the trusted server 410) can confirm the same without having the private key. In this example, the presenter may be both the subject identified and the issuer identified by the JWT, the value of the CNF key may be a JSON object, and the members of that object may identify the key.

At block 610, the authorization server 406 may bind the CNF key to the identifying information to generate the access token.

At block 612, the authorization server 406 may return the generated PoP token to the application server 404. The client computing device 402 may generate a PoP token for use over an entire session but a new PoP token may be generated more than once per session (even for every request) using the same access token. Thus, PoP token-based authentication can be efficient and effective even in a connectionless query/response exchange scenario typical of some HTTP communications in which the connection is completed with each response.

In accordance with one or more of the embodiments described herein, proof of possession may be implemented, e.g., with OAuth 2.0, with a request by the client computing device 402 for an access token from the authorization server 406 via the application server 404. The request may include key material (e.g., token binding type, key, and key parameters) that the client computing device 402 possesses or has access to, such as a public key of an asymmetric key pair. In some embodiments, the public key may be a CNF key, which may be added to the access token and a JWT signed by the authorization server 406. The private key may be retained by the client, who may then use the PoP token to prove possession of the private key.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by an application server to secure web communications, comprising:
   receiving, via a first communications channel, a resource request that contains presenter-identifying information identifying a presenter of the resource request;
   determining whether the resource request includes a proof of possession (PoP) token configured to bind at least the presenter and the first communications channel;
   in response to determining that the resource request does not include the PoP token:
      requesting an access token from an authorization server, the request for the access token including a confirmation (CNF) key and the presenter-identifying information contained in the resource request;
      receiving the requested access token from the authorization server, the received access token including the CNF key bound to the presenter-identifying information by the authorization server indicating that the presenter is in possession of authenticated credentials corresponding to at least the presenter and the first communications channel;
      creating a secure second communications channel, including securing the first communications channel to the application server using a cryptographic scheme; and
      sending the access token to the presenter via the secure second communications channel; and
   in response to determining that the resource request does include the PoP token:
      forwarding the request and the PoP token to a trusted server.

2. The method of claim 1, further comprising:
   receiving a first response to the forwarded request from the trusted server;
   generating a second response based at least on the received first response; and
   returning the generated second response.

3. The method of claim 2, further comprising:
   before receiving the resource request, participating in establishing a communications connection with the presenter over the first communications channel; and
   after sending the access token to the presenter, closing the communications connection.

4. The method of claim 1, wherein the secure second communications channel is a secure communications channel established using public key cryptography (PKC).

5. The method of claim 1, wherein the application server and the authorization server are hosted on the same machine.

6. The method of claim 1, wherein:
   the presenter-identifying information includes at least two device identifiers of a device utilized by the presenter to send the resource request; and
   one of the at least two device identifiers is a Mobile Station International Subscriber Directory Number (MSISDN) of the device.

7. The method of claim 6, wherein one of the at least two device identifiers is an aggregated user identifier managed by a communications carrier.

8. The method of claim 1, further comprising:
obtaining a refresh token from the authorization server with the access token, the refresh token carrying the same credentialing as the PoP token; and
providing the refresh token to the presenter.

9. The method of claim 1, further comprising:
obtaining a refresh token from the authorization server, the refresh token carrying the same credentialing as the PoP token;
providing the refresh token to the presenter; and
receiving the refresh token from the presenter with another resource request after providing the refresh token to the presenter.

10. The method of claim 9, wherein the refresh token is obtained with the access token.

11. The method of claim 1, wherein the CNF key is JWT signed by the authorization server.

12. An application server, comprising:
one or more processors; and
memory to maintain one or more components executable by the one or more processors, the one or more components configured to:
receive, via a first communications channel, a resource request that contains presenter-identifying information identifying a presenter of the resource request;
determine whether the resource request includes a proof of possession (PoP) token configured to bind at least the presenter and the first communications channel; and
in response to determining that the resource request does not include the a PoP token:
request an access token from an authorization server, the request for the access token including a confirmation (CNF) key and the presenter-identifying information contained in the resource request;
receive the requested access token from the authorization server, the received access token including the CNF key bound to the presenter-identifying information by the authorization server indicating that the presenter is in possession of authenticated credentials corresponding to at least the presenter and the first communications channel;
create a secure second communications channel, including securing the first communications channel to the server using a cryptographic scheme;
send the access token to the presenter via the secured second communications channel; and in response to determining that the resource request does include the PoP token:
forward the request and the PoP token to a trusted server.

13. The application server of claim 12, wherein the one or more components are further configured to:
receive a response to the forwarded request from the trusted server;
generate a response based at least on a servicing by the trusted server; and
return the generated response.

14. The application server of claim 12, wherein:
the presenter-identifying information includes at least two device identifiers of a device utilized by the presenter to send the resource request; and
one of the at least two device identifiers is a Mobile Station International Subscriber Directory Number (MSISDN) of the device.

15. The application server of claim 14, wherein one of the at least two device identifiers is an aggregated user identifier managed by a communications carrier.

16. The application server of claim 12, wherein the one or more components are configured to:
before receiving the resource request, establish the communications channel with the presenter; and
before authenticating the at least one credential of the presenter, close the communications channel.

17. The application server of claim 12, wherein the one or more components are further configured to:
obtain a refresh token from the authorization server with the access token, the refresh token carrying the same credentialing as the PoP token; and
provide the refresh token to the presenter.

18. The application server of claim 12, wherein the one or more components are further configured to:
obtain a refresh token from the authorization server, the refresh token carrying the same credentialing as the PoP token;
provide the refresh token to the presenter; and
receive the refresh token from the presenter with another resource request after providing the refresh token to the presenter.

19. The application server of claim 18, wherein the refresh token is obtained with the access token.

20. The application server of claim 12, wherein the CNF key is JWT signed by the authorization server.

* * * * *